(12) United States Patent
Wood

(10) Patent No.: US 6,848,589 B2
(45) Date of Patent: Feb. 1, 2005

(54) DIMPLE PERFORATED WALL PANEL SYSTEM

(75) Inventor: Graham R. Wood, Glencoe, IL (US)

(73) Assignee: Opto International, Inc., Wheeling, IL (US)

( * ) Notice: Subject to any disclaimer, the term of this patent is extended or adjusted under 35 U.S.C. 154(b) by 0 days.

(21) Appl. No.: 10/199,792

(22) Filed: Jul. 19, 2002

(65) Prior Publication Data

US 2004/0011755 A1 Jan. 22, 2004

(51) Int. Cl.$^7$ .............................................. A47B 47/00
(52) U.S. Cl. .................. 211/189; 211/193; 248/220.21
(58) Field of Search .................. 211/189, 192, 211/186, 187, 190, 193, 86.01, 87.01, 90.01, 90.02, 90.04, 103, 204, 206; 248/218.4, 220.21, 222.51, 224.8, 221.11, 221.12, 225.11, 223.41, 220.31

(56) References Cited

U.S. PATENT DOCUMENTS

| | | | | |
|---|---|---|---|---|
| 1,937,935 A | * | 12/1933 | Zimmerman | 108/110 |
| 3,014,597 A | * | 12/1961 | McWherter | 211/175 |
| 3,018,900 A | * | 1/1962 | Huet | 211/193 |
| 3,602,159 A | * | 8/1971 | Marschak | 108/187 |
| 4,070,803 A | | 1/1978 | Gartung | |
| 4,344,367 A | | 8/1982 | Merl | |
| 4,434,900 A | | 3/1984 | Cook | |
| 4,492,169 A | | 1/1985 | Ware et al. | |
| 4,497,411 A | * | 2/1985 | DeBortoli | 211/26 |
| 4,625,477 A | | 12/1986 | Johnstonbaugh | |
| 4,762,299 A | * | 8/1988 | Langelier | 248/220.22 |
| 4,821,649 A | * | 4/1989 | Andersson | 108/107 |
| 4,860,812 A | * | 8/1989 | DePietro et al. | 160/135 |
| 5,074,422 A | | 12/1991 | Holtz | |
| 5,443,167 A | * | 8/1995 | Menaged et al. | 211/106.01 |
| 5,566,844 A | * | 10/1996 | Bernardin | 211/189 |
| 5,592,886 A | | 1/1997 | Williams et al. | |
| 5,607,070 A | * | 3/1997 | Hellyer | 211/189 |
| 5,673,803 A | * | 10/1997 | Burback | 211/87.01 |
| 5,758,988 A | * | 6/1998 | Theodorou | 403/331 |
| 5,927,517 A | * | 7/1999 | Lipman et al. | 211/59.1 |
| 5,944,203 A | | 8/1999 | Vhah et al. | |
| 5,988,409 A | | 11/1999 | Gusdorf et al. | |
| 6,164,467 A | * | 12/2000 | DePottey et al. | 211/189 |
| 6,230,907 B1 | | 5/2001 | Stuart | |
| 6,293,507 B1 | * | 9/2001 | Gorniak | 248/243 |
| 6,315,135 B1 | | 11/2001 | Stuart | |
| 6,378,709 B1 | | 4/2002 | Stuart | |
| 6,481,584 B1 | * | 11/2002 | Cantley | 211/87.01 |
| 2002/0195410 A1 | * | 12/2002 | Lin | 211/190 |

FOREIGN PATENT DOCUMENTS

| | | |
|---|---|---|
| AU | 25618/84 | 3/1984 |
| EP | 0442750 | 2/1991 |
| JP | 2001211975 | 8/2001 |
| JP | 200295557 | 4/2002 |
| WO | WO 95/10208 | 4/1995 |

* cited by examiner

*Primary Examiner*—Carl D. Friedman
*Assistant Examiner*—Jennifer E. Novosad
(74) *Attorney, Agent, or Firm*—Welsh & Katz, Ltd.

(57) ABSTRACT

This system for holding items has at least one upright with a series of first engagement devices. At least one panel assembly is provided and the at least one panel assembly has a panel with at least one receiving structure and has at least one reinforcing channel. The reinforcing channel is attached to the panel and has a series of second engagement devices for engaging the series of first engagement devices. At least one item holding device is provided for engaging at least one of the receiving structures of the panel assembly. The panel has a series of panel slots, which align with channel slots in the reinforcing channel to form further receiving structures for the item holding device.

26 Claims, 4 Drawing Sheets

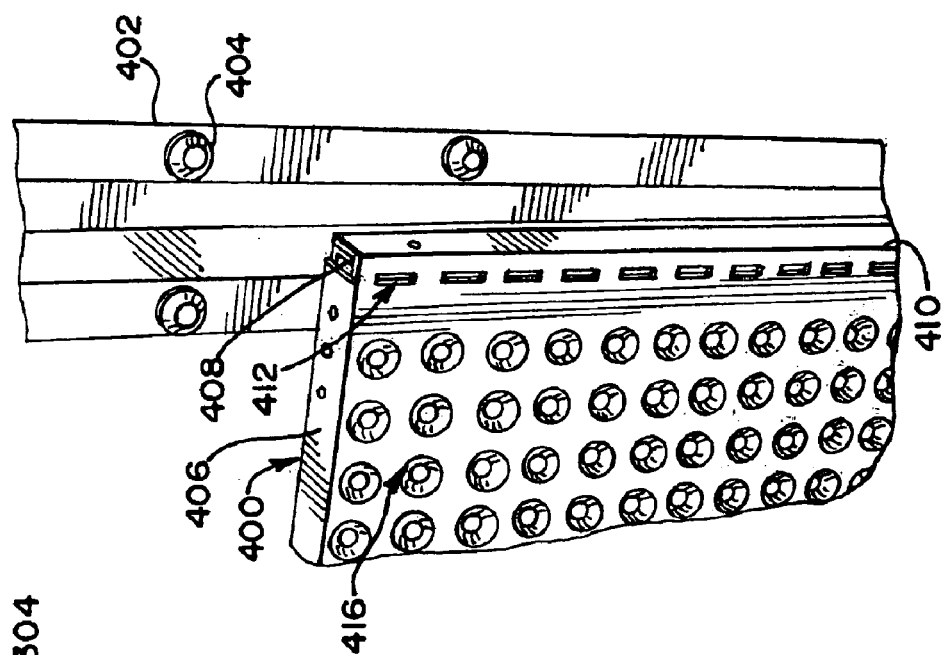
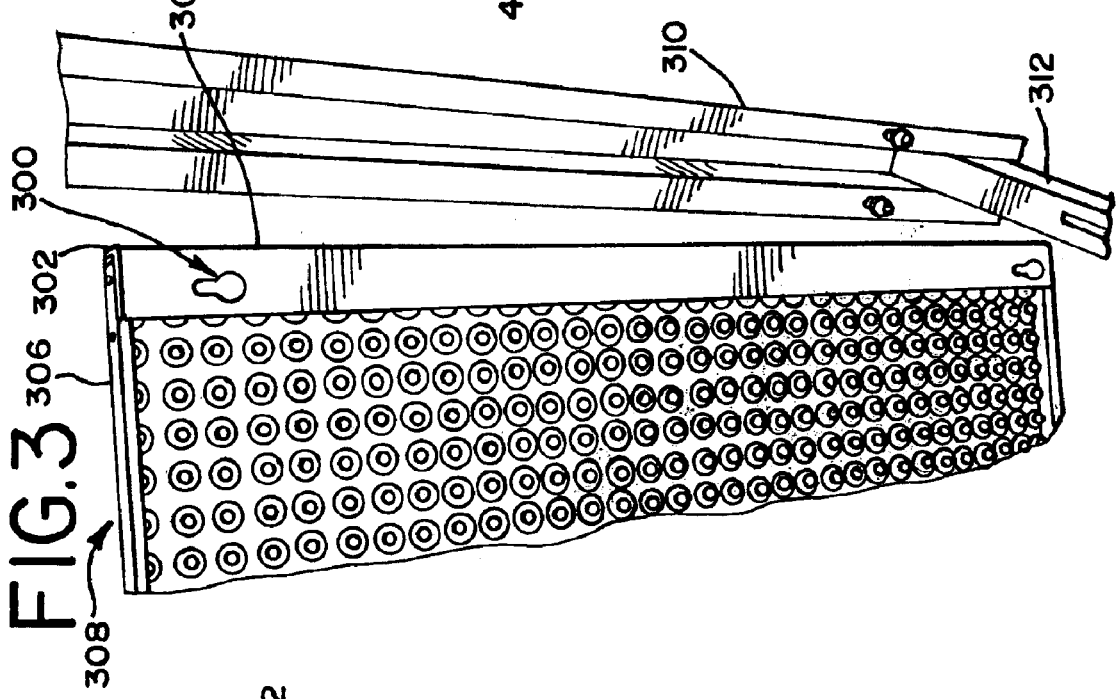
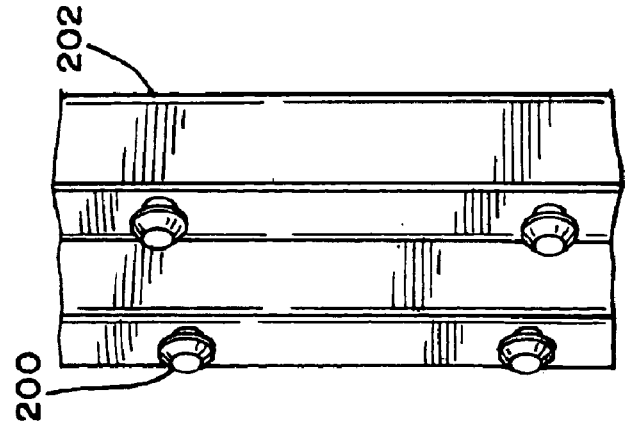

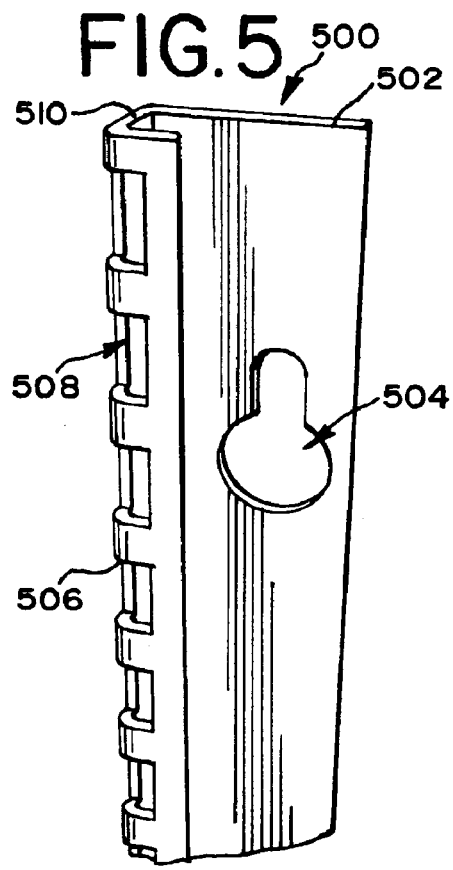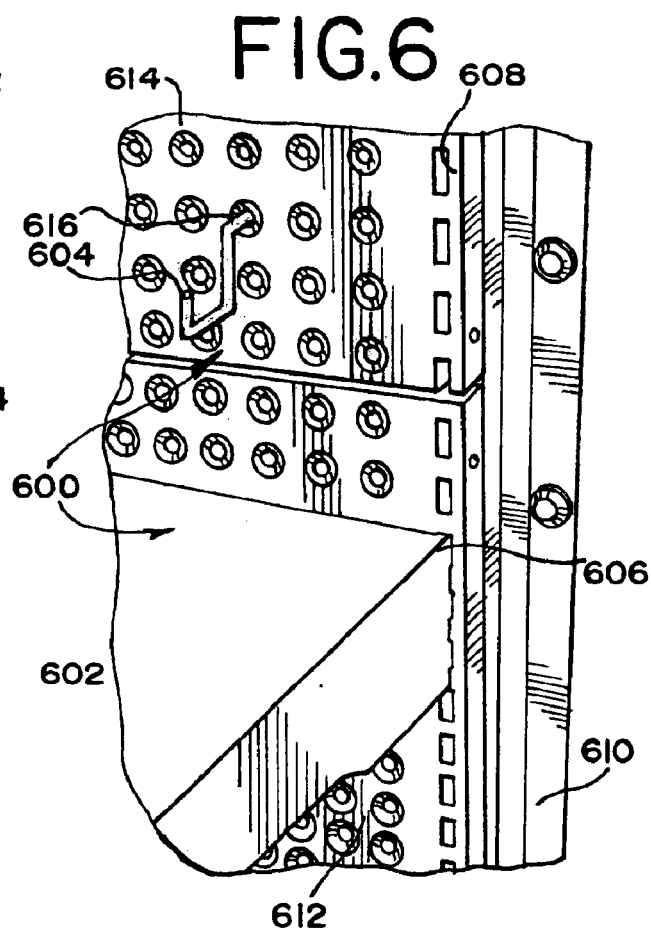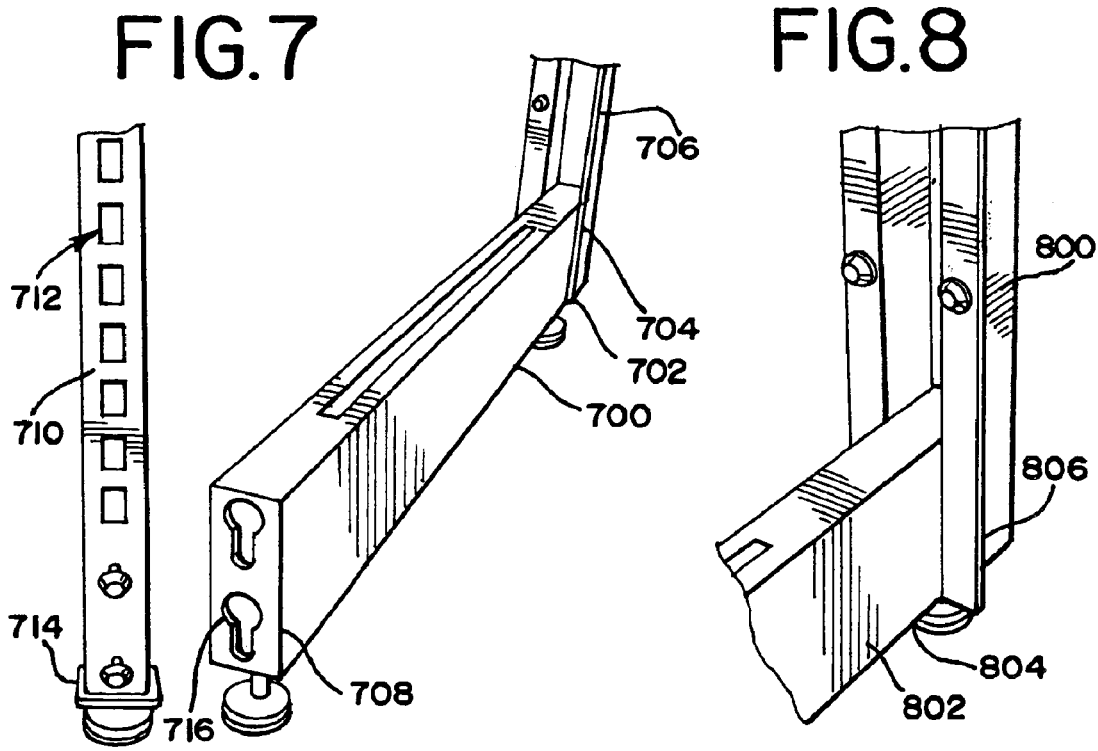

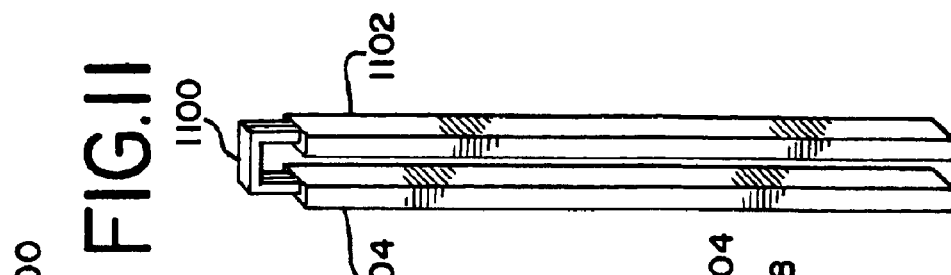
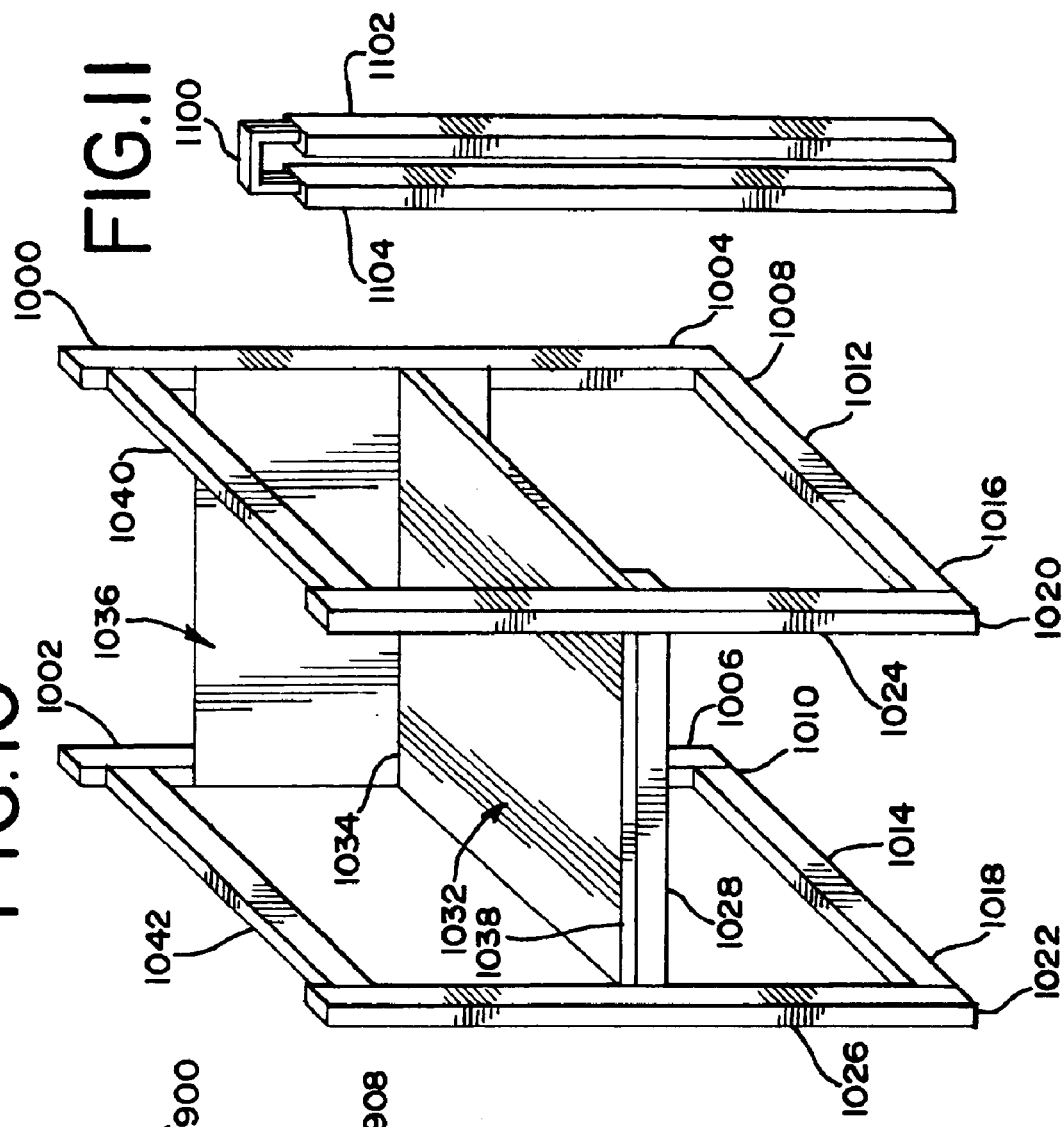
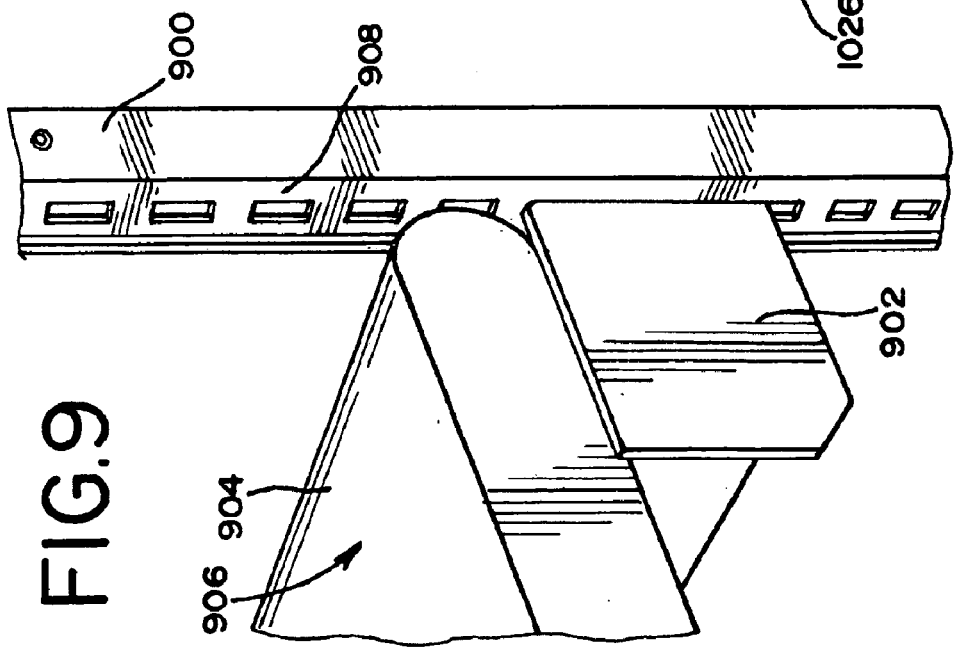

DIMPLE PERFORATED WALL PANEL SYSTEM

FIELD OF THE INVENTION

The present invention relates in general to systems for holding items, and in particular, to systems such as adjustable wall-mounted systems having shelves, display devices for exhibiting products to consumers at a point of purchase location, and to panel wall modules with removal shelving and wall hanger bracket assemblies.

BACKGROUND

A variety of shelves, racks, carousels and other arrangements have been used in the prior art for displaying products or other items to customers at point of purchase locations.

There are numerous types of known systems for displaying or storing items. Freestanding item display systems are known which have display panels and means for securing articles for display on the face of the panel. One freestanding display apparatus has a plurality of panels arranged in a variety of configurations relative to one another and interconnected with one or more upstanding posts to form the freestanding display apparatus.

In general, shelving systems are known that have a plurality of flat shelves supported by several post members resting on the floor. Typically such systems are often made of metal and are adjustable to various shelf heights. Individual shelves can be secured to the posts at varying heights to accommodate support items of various sizes. Shelving systems are also known to have a plurality of flat shelves that are supported by brackets that are secured to a wall.

Typically, such shelving units or display systems are manufactured from metal components. In order to produce systems that are economical and cost-effective, the thickness of the metal used is kept to a minimum. This results many times in shelving systems and display systems that are not strong enough for certain items, and result in either collapse or breakage of the system, or sagging of the shelves, or other deformations of system components. Thus, there is a need, in the prior art for a system, which is economical to manufacture, yet has the strength of materials to support a variety of items for display.

SUMMARY OF THE INVENTION

In general terms, this system for holding items has at least a one upright with a series of first engagement devices. At least one panel assembly is provided and the at least one panel assembly has a panel with at least one receiving structure and at least one reinforcing channel. The reinforcing channel is attached to the panel and has a series of second engagement devices for engaging the series of first engagement devices. At least one item holding device is provided for engaging the at least one receiving structure of the at least one panel assembly.

In other terms, the system for holding items has at least one means for supporting having a series of first means for engaging, at least one means for attachment, at least one means for reinforcing and at least one means for holding an item. The means for reinforcing is secured to the means for attachment and has a series of second means for engaging. The second means for engaging, engages the first series of first means for engaging. The at least one means for holding is attachable to the at least one means for attachment.

BRIEF DESCRIPTION OF THE DRAWINGS

The features of the present invention which are believed to be novel, are set forth with particularity in the appended claims. The invention may best be understood by reference to the following description taken in conjunction with the accompanying drawings, and in which:

FIG. 2 is a close-up view of an upright having mounting projections in an embodiment of the system;

FIG. 3 depicts a dimpled, perforated panel used in an embodiment of the system;

FIG. 4 depicts the panel assembled with the upright in an embodiment of the system;

FIG. 5 is a close-up view of a reinforcing channel in an embodiment of the system;

FIG. 6 depicts a shelving unit in an embodiment of the system;

FIG. 7 depicts, in a further embodiment of the system, a support rail;

FIG. 8 depicts another view of the support rail attached to the upright in an embodiment of the system;

FIG. 9 depicts an embodiment having outriggers for providing additional shelving support;

FIG. 10 depicts an embodiment that is freestanding; and

FIG. 11 depicts an embodiment wherein two freestanding units are joined together.

DETAILED DESCRIPTION

Figure 1:
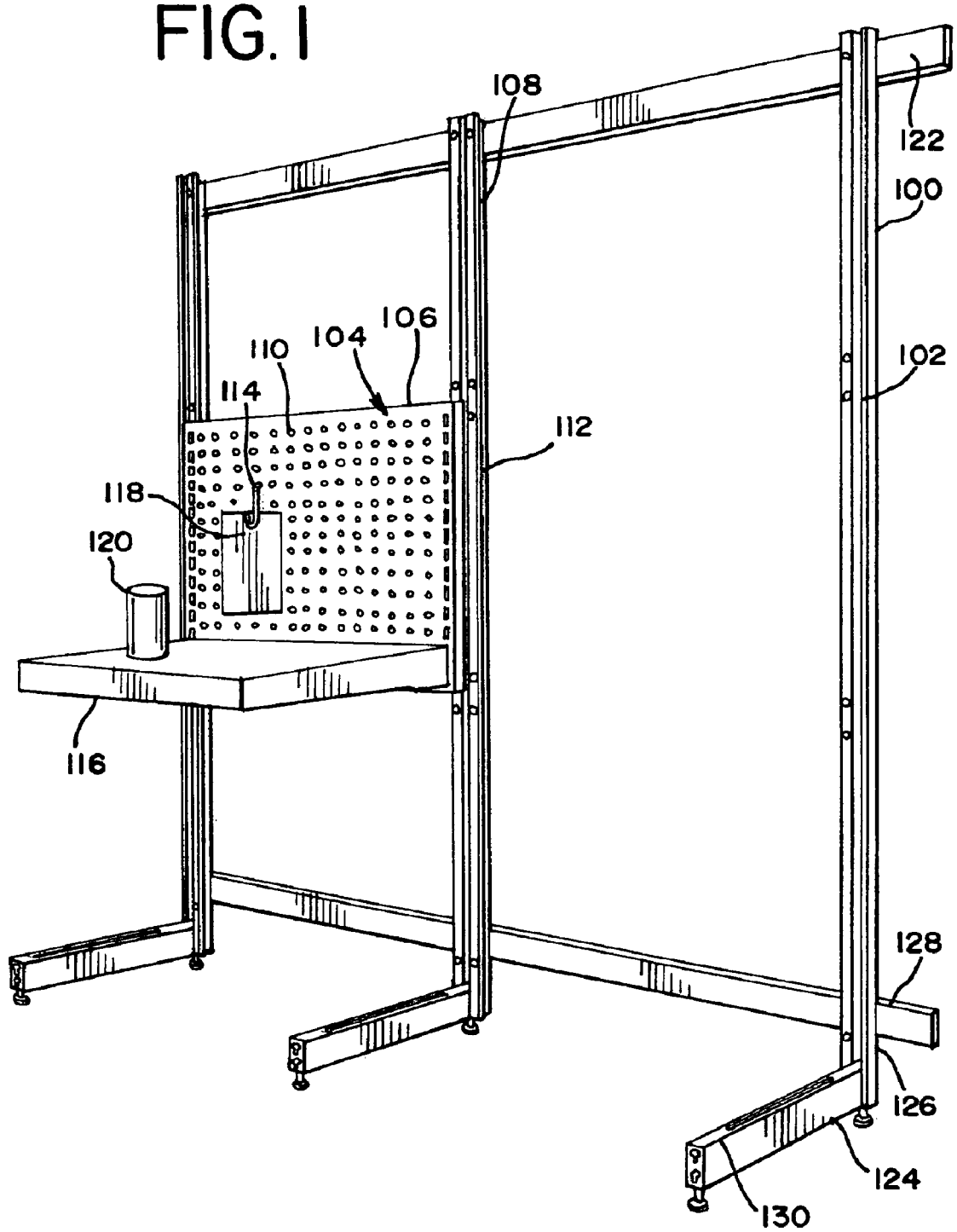
FIG. 1 depicts an embodiment of the system for holding items.

While the present invention is susceptible of embodiments of various forms, there is shown in the drawings, and will hereinafter be described, some exemplary and non-limiting embodiments, with the understanding that the present disclosure is to be considered an exemplification of the invention. It is not intended to limit the invention to the specific embodiments illustrated.

An embodiment of the system for holding items is depicted in FIG. 1. As shown in FIG. 1, an upright 100 has a series of first engagement devices 102. At least one panel assembly 104 is formed of a panel 106 and a reinforcing channel 108. The reinforcing channel 108 is attached to the panel 106, and has a series of second engagement devices for engaging the first series of engagement devices 102 on the upright 100. The second series of engagement devices are depicted in FIG. 3. The panel 106 has at least one receiving structure, such as panel hole 110 or panel slot 112. At least a one item holding device is provided and engages the at least one receiving structure of the panel assembly 104. For example, as depicted in FIG. 1, in this embodiment the item holding device may be a hook 114, which engages one or more holes 110 in the panel 106. The item holding device may also be a shelf 116, which engages the slots 112 in the panel 106. As depicted in FIG. 1, the hook 114 supports an item 118 and the shelf 116 supports an item 120.

In the embodiment depicted in FIG. 1, the upright 100 is attached to a wall 122. Further support is provided in the system by use of a support rail 124, which has a first end 126 attached to a bottom end 128 of the upright 100. The second end 130 of the support rail 124 is opposed from the first end 126. The support rail 124 in the depicted embodiment extends away from the upright 100. It is to be understood that the unit can be freestanding or attached to a wall. The unit may also be attached to other structures rather than a wall, such as a post, or it may be attached to only the floor or ceiling depending upon the environment and application. Also, it is to be understood that the system can be used with or without the support rails 124, again depending upon the application. Also, additional support rails can be utilized along the upright 100 as may be desired. Thus that there is a large number of embodiments that are encompassed by the present invention.

In an embodiment of the system, as depicted in FIG. 2, the series of first engagement devices are mounting projections 200 on the upright 202. Referring also to FIG. 3, the projections 200 engage keyhole apertures 300 in the reinforcing channel 302. The reinforcing channel 302 is attached to an edge side 304 of a panel 306. In this embodiment the panel 306 has a dimpled perforated configuration, and with the reinforcing channel 302 forms a panel assembly 308. It is to be appreciated that the reinforcing channel 302 provides strength to the system so that the system can support a large variety of items while still being cost effective. An upright 310 and a support rail 312 are also depicted in FIG. 3.

It is to be understood that numerous other means can be utilized for attaching the reinforcing channel 302 depicted in FIG. 3 to the mounting projections 200 depicted in FIG. 2. For example, the reinforcing channel may be screwed or bolted to the upright or the reinforcing channel may, in some applications, be permanently attached to the upright by welding, gluing, etc. Also, other mechanisms and structural configurations may be utilized in place of the mounting projections and keyhole apertures for removably attaching the panel assembly to the upright supports.

FIG. 4 depicts a panel assembly 400 mounted on an upright 402. In this embodiment the upright 402 is shown with mounting projections 404. The panel assembly 400 is formed of a panel 406 and a reinforcing channel 408. The reinforcing channel 408 is attached to a side edge 410 of the panel 406. The panel 406 has a series of panel slots 412 which align with channel slots (not shown) in the reinforcing channel 408. The panel 406 is thus strong enough for heavy-duty use due to the use of the reinforcing channel 408, while allowing the panel 406 to be economically manufactured in terms of the amount of material needed to form the panel 406. In general the panel 406 has receiving structures for engaging item holding devices. In the embodiment depicted in FIG. 4, receiving structures may be panel holes 416 in the panel 406 as well as panel slots 412. For standard industry grade hooks and similar attachments, the panel 406 may have dimpled perforated holes (such as depicted panel holes 416) to thereby simulate a ¼" peg board for which such hooks and similar attachments are designed.

FIG. 5 is a detail view of a reinforcing channel 500. In this embodiment the reinforcing channel 500 has a back 502 in which keyhole openings 504 are provided. These keyhole openings 504 form the second engagement means, which engage the mounting projections 200 (first engagement means) depicted in FIG. 2. The reinforcing channel 500 also has a front 506 with a series of channel slots 508. A side 510 of the reinforcing channel 500 connects that back 502 to the front 506. In this embodiment, only one side 510 is utilized, but another side may be utilized to connect the back 502 to the front 506 of the channel 500, or other types of structures and configurations may be utilized for connecting the back 502 to the front 506. As previously described, the channel slots 508 align with the panel slots 412 in the panel 406 depicted in FIG. 4. The reinforcing channel 500 may be secured to the panel 406 on side edge 410 as depicted in FIG. 4 by a variety of means, such as a press fit, riveting, welding, screwing, bolting, etc.

FIG. 6 shows a further embodiment of the system wherein item holding devices 600 may be, for example, a shelf 602 or a hook 604. The shelf 602 has an attaching device 606, which proceeds through the panel slot 608 and engages the channel slot (not shown) in the reinforcing channel (not shown), which is attached to the side edge 610 of the panel 612. Thus the shelf 602 is held by the reinforcing channel in conjunction with the panel 612, and is not just attached to the panel 612. The shelf 602 can therefore be used for heavy-duty applications. The size and configuration of the panel 612 may be varied depending upon the application. For example, as depicted in FIG. 6 a second panel 614 is provided above the panel 612. Also, various other structures and configurations may be used in place of the panel holes 616 in the panel 614 and 612.

In a further embodiment of the system as depicted in FIG. 7, a support rail 700 has a first end 702 attached to a bottom end 704 of an upright 706. The support rail 700 extends out away from the upright 706 and ends at a second 708. An outrigger 710 attaches to the second end 708 of the support rail 700 and may be utilized to support for example, a front portion of a shelf unit. Various structures and configurations may be utilized for attaching the front portion of the shelf to the outrigger 710, and in FIG. 7 a series of outrigger slots 712 are depicted for engagement with such a shelf unit. The outrigger slots 712 may align height wise with the panel slots. In the embodiment depicted in FIG. 7, the outrigger 710 may be secured to the second end 708 by mounting projections 714 and keyhole apertures 716. Other types of securing systems may also be utilized, such as bolts, screws, etc. for attaching the outrigger 710 to the second end 708 of the support rail 700. Furthermore, a plurality of support rails 700 along the upright 706 may be utilized, each of which being attached to the outrigger 710.

FIG. 8 is another view of an upright 800 and a support rail 802. In this embodiment, the first end 804 of the support rail 802 is permanently attached, such as by welding or cementing, to the bottom end 806 of the support 800.

FIG. 9 depicts outriggers 900 interconnected by at least one support bar 902. The support bar 902 supports a front edge 904 of a shelf 906. Furthermore, the support bar 902 may extend across a number of outriggers 900. For example, in one embodiment the outriggers are spaced approximately four feet apart, and an eight-foot support bar is attached to three of the outriggers. Various means may be used for attaching the support bar 902 to the outrigger 900, for example, by hook type structure (not shown) that engages slots 908 in the outrigger 900, or by bolts, screws, etc. The shelf 906 may sit one the support bar 902, or the shelf 906 may have the front edge attached to the support bar 902 by bolts, screws, fasteners, etc.

FIG. 10 depicts a free standing embodiment in which uprights 1000, 1002 have bottom ends 1004, 1006 attached to first ends 1008, 1010 of support rails 1012, 1014. Second ends 1016, 1018 of the support rails 1012, 1014 are attached to bottom ends 1020, 1022 of outriggers 1024, 1026. A support bar 1028 is connected to the outriggers 1024, 1026. In this embodiment a shelf 1032 has a rear edge 1034 that is connected to a panel assembly 1036, which in turn is connected to the uprights 1000, 1002 as described above. A front edge 1038 of the shelf 1032 may be attached to, or may rest on, the support bar 1028. Additional support rails may be provided, such as support rails 1040, 1042.

Additional freestanding assemblies, such as depicted in FIG. 10, may be secured to one another by a joining device, such as bracket 1100 that is depicted in FIG. 11. The bracket 1100 in this embodiment joins the tops 1102, 1104 of two uprights 1106, 1108. Various types of frames or other structures may be used for joining several of the freestanding assemblies.

The system for holding items as set forth in the various embodiments described above provides a new freestanding or wall system, which is economical to manufacture, which is heavy duty, and which provides accessory capabilities such as shelving, as well as, steel panels capable of accepting industry standard peg hooks. The use of the reinforcing channels, for example in an embodiment where first and second reinforcing channels are provided at first and second opposed side edges, respectively, of a panel, provide superior strength while still being cost effective with regards to the amount of material used to manufacture the novel system.

The present invention is not limited to the particular details of the apparatus depicted, and other applications are contemplated. Certain other changes may be made in the above-described apparatus without departing from the true spirit and scope of the invention herein involved. In general, the various embodiments of the system may have components, which are formed from different types of materials, such as metal, plastics, etc. and which may have a variety of different cross-sectional configurations, such as, square, rectangular, circular, U-shaped, J-shaped, etc. The system may be free standing or wall mounted, and may have a plurality of different types of panels for engaging with different types of item support devices, such as shelves, hooks, etc. It is intended, therefore, that the subject matter in the above depiction shall be interpreted as illustrative and not in a limiting sense.

What is claimed is:

1. A system for holding items, comprising:
   at least one upright having a series of first engagement devices;
   at least one panel assembly, the at least one panel assembly having a panel with at least one receiving structure and at least one reinforcing channel, the reinforcing channel attached to the panel and having a series of second engagement devices for engaging the first series of engagement devices, the at least one panel assembly further having at least one second receiving structure; and
   at least one item holding device for engaging the at least one receiving structure of the at least one panel assembly, the at least one item holding device being usable for holding an item; and
   wherein the at least one item holding device has an attaching device that extends through one of the second receiving structures of the at least one panel assembly and that engages a respective first channel-associated receiving structure of the at least one reinforcing channel, the respective first and second receiving structures being adjacent one another.

2. A system for holding items, comprising:
   at least one upright having a series of first engagement devices;
   at least one panel assembly, the at least one panel assembly having a panel with at least one receiving structure and at least one reinforcing channel, the reinforcing channel attached to the panel and having a series of second engagement devices for engaging the first series of engagement devices; and
   at least one item holding device for engaging the at least one receiving structure of the at least one panel assembly, the at least one item holding device being usable for holding an item;
   wherein the at least one reinforcing channel has a series of first channel-associated receiving structures, and wherein the at least one panel assembly has a series of second receiving structures that align with the series of first channel-associated receiving structures; and
   wherein the reinforcing channel has a back side with the series of second engagement devices thereon, a front side with the series of first receiving structures thereon, and at least one side that connects the back side to the front side.

3. A system for holding items, comprising:
   at least one upright having a series of mounting projections;
   at least one panel assembly comprising a sheet panel comprising individual dimpled perforations and slots and at least one reinforcing channel, the reinforcing channel attached to the panel and having a series of openings for engaging the series of mounting projections; and
   at least one item holding device for engaging either the dimpled perforations or the slots of the at least one panel, the at least one item holding device being usable for holding an item.

4. The system according to claim 3, wherein the at least one reinforcing channel has a series of first receiving structures, and wherein the at least one panel assembly has a series of second receiving structures that align with the series of first receiving structures.

5. The system according to claim 4, wherein the reinforcing channel has a back side the series of openings therein, a front side with the series of first receiving structures therein, and at least one side that connects the back side to the front side.

6. The system according to claim 4, wherein the first receiving structures are a series of panel slots and wherein the second receiving structures are a series of channel slots.

7. The system according to claim 3, wherein the panel has at least one side edge, and wherein the reinforcing channel is attached to the side edge.

8. The system according to claim 3, wherein the system further comprises at least one support rail having a first end attached to the at least one upright and having a second end opposed from the first end, the at least one support rail extending away from the at least one upright.

9. The system according to claim 8, wherein the system further comprises at least one outrigger respectively attached to the second end of the at least one support rail.

10. A system for holding items, comprising:
    at least one upright having a series of mounting projections;
    at least one panel assembly, comprising at least one receiving structure, the at least one panel assembly having a panel and at least one reinforcing channel, the reinforcing channel attached to the panel and having a series of openings for engaging the series of mounting projections;
    at least one item holding device for engaging the at least one receiving structure of the at least one panel assembly, the at least one item holding device being usable for holding an item;
    wherein the at least one reinforcing channel has a series of first receiving structures, and wherein the at least one panel has a series of second receiving structures that align with the series of first receiving structures; and
    wherein the at least one item holding device has an attaching device that extends through one of the second receiving structures of the at least one panel assembly and that engages a respective first receiving structure of the at least one reinforcing channel, the respective first and second receiving structures being adjacent one another.

11. A system for holding items, comprising:

a plurality of uprights, each of the uprights having a series of mounting projections;

at least one panel assembly, the at least one panel assembly having a panel and a least one reinforcing channel, the reinforcing channel attached to the panel and having a series of openings for engaging the series of mounting projections;

the at least one reinforcing channel having a series of channel slots;

the at least one panel assembly having a series of panel slots that align with the series of channel slots; and at least one item holding device having an attaching device that extends through a respective panel slot of the series of panel slots of the at least one panel and that engages a respective channel slot of the series of channel slots of the at least one reinforcing channel, the respective panel and the respective channel slot being adjacent one another, and the at least one item holding device being usable for holding an item.

12. The system according to claim 11, wherein the reinforcing channel has a back side with the series of openings therein, a front side with the series of channel slots therein, and at least one side that connects the back side to the front side.

13. The system according to claim 11, wherein the panel has at least one side edge, and wherein the reinforcing channel is attached to the side edge.

14. The system according to claim 11, wherein the system further comprises at least one support rail having a first end attached to a respective upright of the plurality of uprights and having a second end opposed from the first end, the support rail extending away from the respective upright.

15. The system according to claim 14, wherein the system further comprises at least one outrigger respectively attached to the second end of the at least one support rail.

16. A system for holding items, comprising:

a plurality of uprights, each of the uprights having a series of mounting projections;

at least one panel assembly, the at least one panel assembly having a panel with first and second edge sides, and having at least first and second reinforcing channels attached to the first and second sides, respectively, of the panel, each of the reinforcing channels having a series of openings for engaging the series of mounting projections on a respective upright of the plurality of uprights;

each of the reinforcing channels having a series of channel slots;

the at least one panel assembly having first and second series of panel slots in areas of the first and second edge sides, respectively, of the panel, the first and second series of panel slots aligning with respective series of channel slots in the first and second reinforcing channels; and at least one item holding device having an attaching device that extends through a respective panel slot of the series of panel slots of a respective side of the first and second sides of the at least one panel assembly and that engages a respective channel slot of the series of channel slots of the first and second reinforcing channels, the respective panel slot and the respective channel slot being adjacent one another, and the at least one item holding device being usable for holding an item.

17. The system according to claim 16, wherein each of the reinforcing channels has a back side with the series of openings therein, a front side with the series of channel slots therein, and at least one side that connects the back side to the front side.

18. The system according to claim 16, wherein the system further comprises at least one support rail having a first end attached to respective upright of the plurality of uprights and having a second end opposed from the first end, the support rail extending away from the respective upright.

19. The system according to claim 18, wherein the system further comprises at least one outrigger respectively attached to the second end of the at least one support rail.

20. A system for holding items, comprising:

at least one means for supporting having a plurality of means for engaging, formed as individual dimpled perforations and slots;

at least one means for attachment;

at least one means for reinforcing, the means for reinforcing secured to the means for attachment and having a series of second means for engaging, the second means for engaging being engaged with the means for engaging; and at least one means for holding an item, the at least one means for holding attachable to one or both of the at least one means for attachment and the at least one means for reinforcing.

21. A system for holding items, comprising:

a plurality of uprights, each of the uprights having a bottom end and a top end, and each of the uprights having a series of mounting projections;

a plurality of support rails, at least a respective support rail of the plurality of support rails having a first end attached to a bottom end of a respective upright of the plurality of uprights and having a second end opposed from the first end, the support rail extending away from the respective upright;

a plurality of outriggers, a respective outrigger of the plurality of outriggers having a bottom end and a top end, and at least a bottom end of a respective outrigger attached to the second end of a respective support rail of the plurality of support rails;

at least one panel assembly having a panel and at least one reinforcing channel, the reinforcing channel attached to the panel and having a series of openings for engaging the series of mounting projections;

the at least one reinforcing channel having a series of channel slots;

the at least one panel assembly having a series of panel slots that align with the series of channel slots; and at least one item holding device having a front edge and a rear edge, the rear edge having an attaching device that extends through a respective panel slot of the series of panel slots of the at least one panel assembly and that engages a respective channel slot of the series of channel slots of the at least one reinforcing channel, the respective panel slot and the respective channel slot being adjacent one another, and the front edge opera tively connected to respective outriggers of the plurality of outriggers.

22. The system according to claim 21, wherein the reinforcing channel has a back side with the series of openings therein, a front side with the series of channel slots therein, and at least one side that connects the back side to the front side.

23. The system according to claim 21, wherein the panel has first and second side edges, and wherein first and second reinforcing channels are attached to the first and second side edges, respectively.

24. The system according to claim 21, wherein the system further comprises at least one support bar connected to respective outriggers of the plurality of outriggers, the support bar engaging the front edge of the item holding device.

25. The system according to claim 21, wherein the system is one of a free standing system where the system further comprises means for retaining the uprights in a vertical orientation, and a wall system where the uprights are secured to a wall.

26. The system according to claim 21, wherein the system is a free standing system wherein the system further comprises means for retaining the uprights in a vertical orientation, and wherein the panel assembly is two sided having receiving structures in at least the center area thereof, the receiving structures being on both sides of the panel assembly, and wherein both sides of the panel assembly have panel slots aligned with the reinforcing slots on respective side edges thereof.

* * * * *